US007486317B2

(12) United States Patent
Kugo

(10) Patent No.: US 7,486,317 B2
(45) Date of Patent: Feb. 3, 2009

(54) IMAGE PROCESSING METHOD AND APPARATUS FOR RED EYE CORRECTION

(75) Inventor: Koichi Kugo, Wakayama (JP)

(73) Assignee: Noritsu Koki, Co., Ltd., Wakayama-shi (JP)

( * ) Notice: Subject to any disclaimer, the term of this patent is extended or adjusted under 35 U.S.C. 154(b) by 607 days.

(21) Appl. No.: 10/974,661

(22) Filed: Oct. 26, 2004

(65) Prior Publication Data

US 2005/0117173 A1 Jun. 2, 2005

(30) Foreign Application Priority Data

Oct. 27, 2003 (JP) ............................ 2003-366132

(51) Int. Cl.
*H04N 5/225* (2006.01)

(52) U.S. Cl. ....................... 348/251; 348/246; 348/247; 348/221.1; 382/167

(58) Field of Classification Search ............. 348/222.1, 348/246, 247, 251; 382/165, 167, 162
See application file for complete search history.

(56) References Cited

U.S. PATENT DOCUMENTS

| | | | | |
|---|---|---|---|---|
| 6,718,051 | B1 * | 4/2004 | Eschbach | 382/117 |
| 7,116,820 | B2 * | 10/2006 | Luo et al. | 382/167 |
| 7,310,443 | B1 * | 12/2007 | Kris et al. | 382/167 |
| 2002/0176623 | A1 * | 11/2002 | Steinberg | 382/165 |
| 2003/0044178 | A1 * | 3/2003 | Oberhardt et al. | 396/158 |
| 2004/0240747 | A1 * | 12/2004 | Jarman et al. | 382/274 |
| 2005/0069219 | A1 * | 3/2005 | Wu | 382/274 |

FOREIGN PATENT DOCUMENTS

| | | |
|---|---|---|
| JP | 06-258732 | 9/1994 |
| JP | 3036285 | 2/2000 |
| JP | 2000-076427 | 3/2000 |

* cited by examiner

*Primary Examiner*—David L Ometz
*Assistant Examiner*—Ahmed A Berhan
(74) *Attorney, Agent, or Firm*—Fulbright & Jaworski LLP

(57) ABSTRACT

An image processing apparatus for correcting red eye phenomenon in photographic image data. This apparatus includes a skin color pixel detecting portion for detecting a skin color pixel in the image data based on a predetermined skin color detection condition, a white color pixel detecting portion for detecting a white color pixel in the image data based on a predetermined white color detection condition, a red color pixel detecting portion for detecting a red color pixel in the image data based on a predetermined red color detection condition, a red eye pixel determining section for setting the detected red color pixel as a red eye pixel candidate and then determining the red eye pixel candidate as a red eye pixel according to a determination condition using the number of the skin color pixels and the number of the white color pixels detected respectively within an area around the red eye pixel candidate and a red eye correcting section for correcting the red eye phenomenon by changing a pixel value of the determined red eye pixel.

9 Claims, 9 Drawing Sheets

IMAGE PROCESSING METHOD AND APPARATUS FOR RED EYE CORRECTION

BACKGROUND OF THE INVENTION

1. Field of the Invention

The present invention relates to an image processing method for correcting a red eye phenomenon occurring in photographically recorded image data and relates also to an apparatus for implementing this method.

2. Description of the Related Art

In flash pictures of such subject as a human or an animal, there can occur a so-called red eye phenomenon resulting from reflection of the flash light off the blood vessels of the retina of the subject's eyes, causing the center of the pupils of the eyes to appear red or in a color different from the actual color thereof. With ever increasing popularity of digital cameras as well as film scanners for digitizing photographic image of a photographic film, various and numerous solutions have been proposed to tackle this problem by means of image processing technique. Of course, correction of red eye phenomenon is possible by a professional technique in which a skilled artisan manually corrects the color of each of pixels of the red eye to its correct color while observing these pixels on a monitor. However, this technique is unpopular since this is extremely troublesome and requires high skill on the part of the artisan. For this reason, there has been proposed an automatic method in which the pupil in the picture is detected by using e.g. a pattern recognition technique or a red portion is picked out from within the image and color change is made on this detected portion. In this case, however, for precise detection of red eye area, very complicated image processing technique is required and also the system implementing the technique tends to be very expensive.

According to another solution known from Japanese Patent Application "Kokai" No. 2000-76427 (paragraphs [0009] to [0011] and [0058] to [0071], and FIG. 10), a read eye portion is separated from a white eye portion and a skin color portion. In this, first, an area including the eye area having the color defect is designated. Then, for this designated area, the technique uses characteristics amounts comprising combination of e.g. brightness and reddishness and utilizes a fact that a trough is formed respectively between the red eye portion and the white eye portion and between the red eye portion and the skin color portion, so that the area is divided for each high point in the characteristics amount. In the red eye portion, the closer to the center of pupil, the stronger the reflection from the retina. So that, the brightness tends to decrease from the center to the peripheral portion, resulting in hill-like distribution of the brightness, including "catch light" in the eye. Also, in the case of an eye having bluish iris, there is formed a trough between a red eye portion and the iris in the magnitude of the redness. The above conventional technique utilizes these phenomena. That is to say, this technique is configured to achieve the separation of the red eye portion from the white eye portion and the skin color portion, based on the intensity distribution of color-related attribute, i.e. the redness, in the eye area, rather than discriminate red eye pixels through detections of red, white, skin color pixels. Moreover, as this conventional technique requires designation of the eye area in advance, for realizing its full automization, a new technology will be needed for image recognition of the eye area, which technology is difficult to achieve.

A still further solution is proposed by e.g. Japanese Patent Application "Kokai" No. 6-258732 (paragraphs [0006] to [0009] and [0019] to [0023], and FIG. 6). This solution comprises a technique for detecting a red eye portion in a photographed subject through extraction of a plurality of color component images unique to a face of a human subject. More particularly, from within a photographic image, at least either a low chroma area or low illumination area and a skin color area are extracted. Then, by using extracted signals, e.g. by effecting a logical AND operation thereon, an area including the subject's eye is extracted. Further, by using the extracted red signals, the red eye position is detected from this area including the eye, if a red eye phenomenon is present therein. Then, based on the red eye position data thus obtained, the red color in the red eye position is corrected to a normal color such as black color. This technique does not require the preliminary designation of the eye area. However, as this technique recognizes a red eye portion based on the skin color and the red color, an erroneous recognition tends to occur.

SUMMARY OF THE INVENTION

In view of the above-described state of the art, a primary object of the present invention is to provide an improved red eye correction technique with sufficient reliability without using any complicated image processing technique such as pattern recognition and without requiring any preparatory operation such as designation of an eye area.

For accomplishing the above-noted object, according to the present invention, a method for correcting red eye phenomenon in photographic image data, comprises the steps of:

detecting a skin color pixel in the image data based on a predetermined skin color detection condition;

detecting a white color pixel in the image data based on a predetermined white color detection condition;

detecting a red color pixel in the image data based on a predetermined red color detection condition;

setting the detected red color pixel as a red eye pixel candidate and then determining the red eye pixel candidate as a red eye pixel according to a determination condition using the number of the skin color pixels and the number of the white color pixels detected respectively within an area around the red eye pixel candidate; and correcting the red eye phenomenon by changing a pixel value of said determined red eye pixel.

According to this red eye correcting method proposed by the present invention, from the entire photographic image, skin color pixels, white color pixels and red color pixels are detected respectively based on the predetermined detection condition individually set therefor. Each detected red color pixel is set as a red eye pixel candidate. Then, based on the respective total numbers of the skin color pixels and the white color pixels present within the area around the red eye pixel candidate, it is determined whether the peripheral area of the red eye pixel candidate is an eye area or not and also whether this red eye pixel candidate actually is a red eye pixel constituting the red eye phenomenon or not. In this way, a red eye pixel is determined, based on distribution conditions of skin, white and red colors which together characterize the tone of a red eye area. Hence, as compared with the conventional red eye detection techniques described above, the invention's method allows red eye pixel detection with satisfactory reliability, with a simple algorithm, yet without requiring any preparatory operation such as the advance designation of an eye area.

In general, a skin color pixel and a white color pixel have very similar color components (e.g. R, G, B components) to each other. This fact presents difficulty in distinction therebetween under certain photographic conditions. For example, the white color, if photographed under a tungsten light, appears as a yellowish color, which color is difficult to be distinguished from the skin color. For this reason, according to one preferred embodiment of the present invention, said skin color detection condition is defined by using respective differences between R, G, B values of each pixel and a brightness value of this pixel. The white color detection condition is defined by using a skin color chroma value of a white color pixel candidate and an average skin color chroma value of the skin color pixels present around the white color pixel candidate. And, the red color detection condition is defined by using a red color chroma value. That is to say, the detection condition for detecting a white color pixel employs a value dependent on an average skin color chroma value of the skin color pixels present around the white pixel candidates. More particularly, when a pixel has a color shifted by a certain degree to a complimentary color of the skin color from the average R, G, B values of the skin color pixels, this pixel (white color pixel candidate) is then determined as a white pixel. With this, precise distinction between white color and skin color is made possible, regardless of certain amount of photographic condition variation.

In the above method, the red eye correction is effected by changing the pixel value of the red eye pixel. As the simplest and most effective method for effecting this operation, it is proposed to reduce the chroma of the red eye pixel. With this chroma reduction, the red eye pixel will appear grayish, thus resulting in a natural looking photographic print. Needless to say, ideally, the color of the red eye pixel should be well balanced with the actual color of pupil. Therefore, if the pupil color is set in advance, it is preferred that the red eye correction be effected in such a manner as to approximate the pixel value of the red eye pixel to a value corresponding to the set pupil color.

In either case, depending on a photographic subject, other than its eye area, there can occur an area with similar distributions of white, skin and red color components to those of the eye area. This can result in an error in the recognition of the red eye pixel. If such red eye like pixel is strongly corrected, the resultant print will appear unnatural. Therefore, if it is possible to predict difficulty in the red eye determination based on e.g. the photographic condition, it will be useful if the degree of the red eye correction is adjusted according to the predicted difficulty in the red eye determination. For instance, in the case of a photography under a special illumination, the distinction between the respective colors becomes difficult. In such case, the degree (intensity) of the red eye correction may be reduced to a half or less, so that the correction will not result in disturbance in the total color balance even if erroneous recognition occurs.

According to a further aspect of the present invention, there is proposed a computer-executable program for causing a computer to implement the above described red eye correction method as well as a computer-readable medium storing such a program therein.

According to a still further aspect of the present invention, there is proposed an image processing apparatus for implementing the red eye correction method. This image processing apparatus for correcting red eye phenomenon in photographic image data, comprises:

a skin color pixel detecting portion for detecting a skin color pixel in the image data based on a predetermined skin color detection condition;

a white color pixel detecting portion for detecting a white color pixel in the image data based on a predetermined white color detection condition;

a red color pixel detecting portion for detecting a red color pixel in the image data based on a predetermined red color detection condition;

a red eye pixel determining section for setting the detected red color pixel as a red eye pixel candidate and then determining the red eye pixel candidate as a red eye pixel according to a determination condition using the number of the skin color pixels and the number of the white color pixels detected respectively within an area around the red eye pixel candidate; and a red eye correcting section for correcting the red eye phenomenon by changing a pixel value of said determined red eye pixel.

Needless to say, with this image processing apparatus too, all of the advantageous functions and effects of the red eye correcting method can be obtained.

Further other features and advantages of the present invention will become apparent upon reading the following detailed description of the preferred embodiments thereof with reference to the accompanying drawings.

DESCRIPTION OF THE PREFERRED EMBODIMENTS

Preferred embodiments of the present invention will be described in details with reference to the accompanying drawings.

Figure 1:
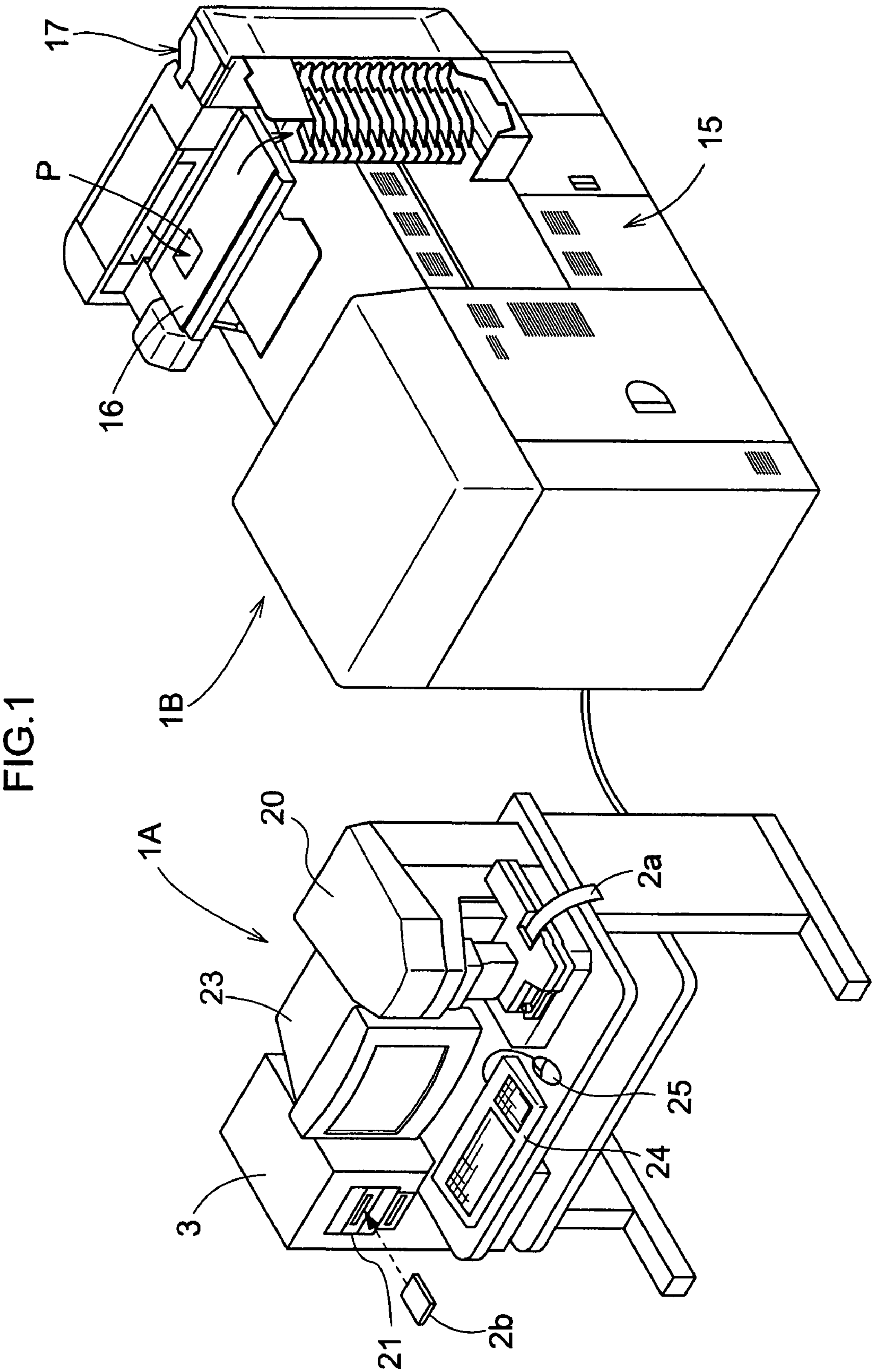
FIG. 1 is a view showing an outer appearance of a photographic printing system employing the red eye correcting technique according to the present invention.

FIG. 1 shows an outer appearance of a photographic printing system employing the red eye correction technique of the present invention. As shown, this printing system consists mainly of a printing station 1B as a photographic printer for effecting exposure and development on a print paper P and an operating station 1A for processing photographic images taken from a developed photographic film 2*a* or various image input media such as a memory card 2*b* for a digital camera and effecting production/transmission of print data to be used in the printing station 1B.

Figure 2:
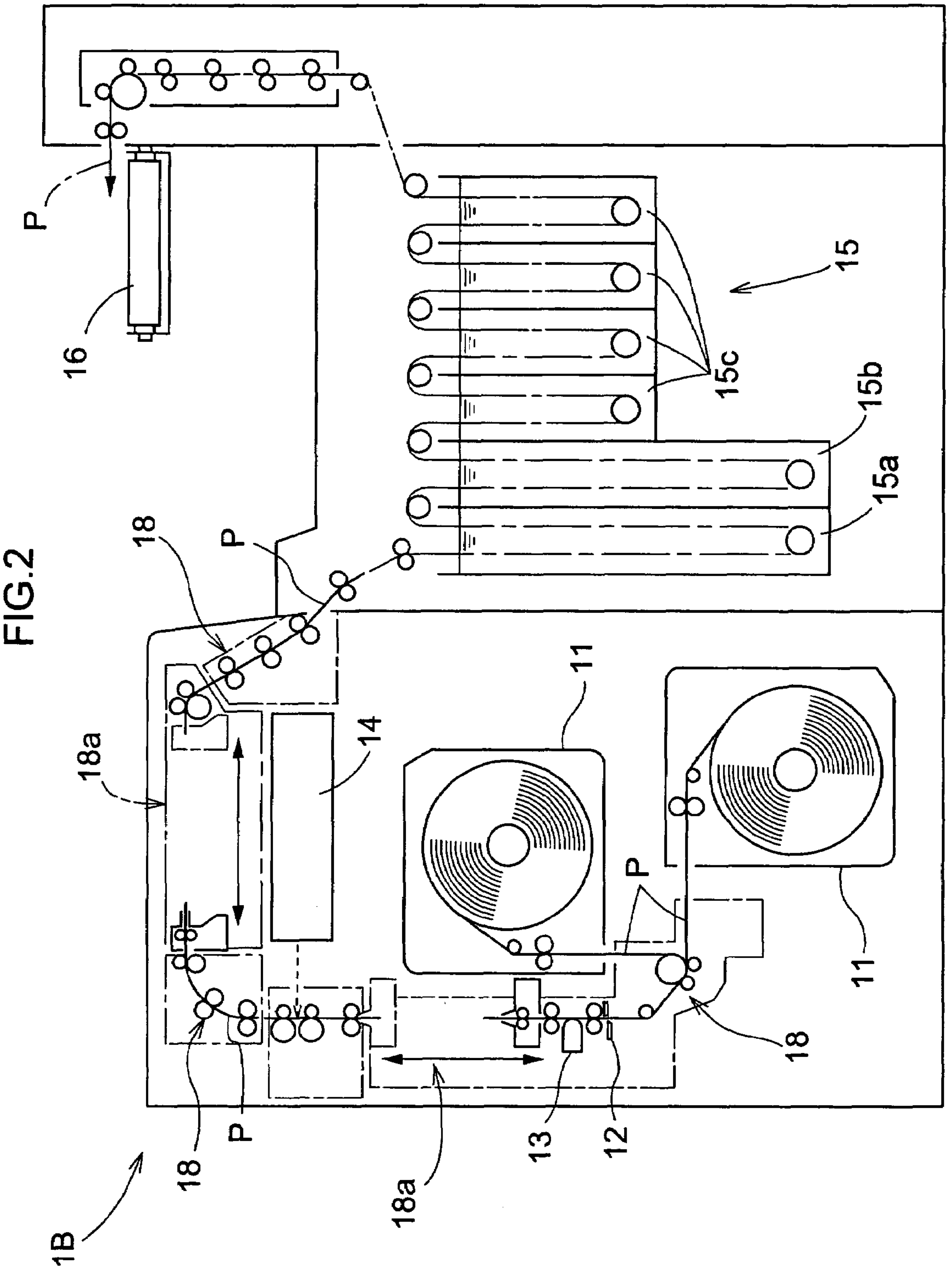
FIG. 2 is a diagram schematically showing a construction of a print station of the photographic printing system.

This photographic printing system is known also as "digital mini-labo". As best understood from FIG. 2, in the printing station 1B, a print paper P stored in the form of a roll in either one of two print paper magazines 11 is drawn out and cut by a sheet cutter 12 to a print size strip. On this print paper P (or print size strip), a back printing unit 13 prints on its back face, color correction information and various print processing information such as a frame number, and a print exposing unit 14 exposes a front face of each paper P with a photographically recorded image. Then, a plurality of such exposed print papers P are fed into a developing tank unit 15 having a plurality of developing solution tanks for their development.

After being dried, the developed print papers P are conveyed by a transverse conveyer 16 to a sorter 17, by which the papers P are sorted according to each customer's order and stacked in a plurality of trays (see FIG. 1).

For transporting the print papers P at a speed adapted or suited for each of the above-described various operations, there is provided a print paper transporting mechanism 18. This print paper transporting mechanism 18 has a plurality of pinch transport roller pairs including chucker type print paper transport units 18*a* disposed before and after the print exposing unit 14 relative to the print paper transporting direction.

The print exposing unit 14 has line exposure heads for effecting irradiation of laser beams of three primary colors, R (red), G (green) and B (blue) along a main scanning direction of the print paper P which is being transported in a sub scanning direction, based on the print data sent from the operating station 1A. The developing solution tank unit 15 includes a color developing solution tank 15*a* which stores therein color developing solution, a bleaching/fixing solution tank 15*b* which stores therein bleaching/fixing solution and stabilizing solution tanks 15*c* which store stabilizing solutions therein.

At an upper position of a desk-like console of the operating station 1A, there is disposed a film scanner 20 for obtaining photographic image data ("image data" hereinafter) from the respective photographically exposed frames of the photographic film 2*a*. Whereas, a media reader 21 for obtaining image data from various types of semiconductor memories, CD-R or the like is incorporated within a general-purpose Personal computer which functions as a controller 3 for this photographic printing system. The general-purpose PC is connected also to a monitor 23 for displaying various kinds of information and a keyboard 24 and a mouse 25 which function as operation input devices (pointing devices) employed as an instruction inputting section when various settings or adjustments are to be effected.

Figure 3:
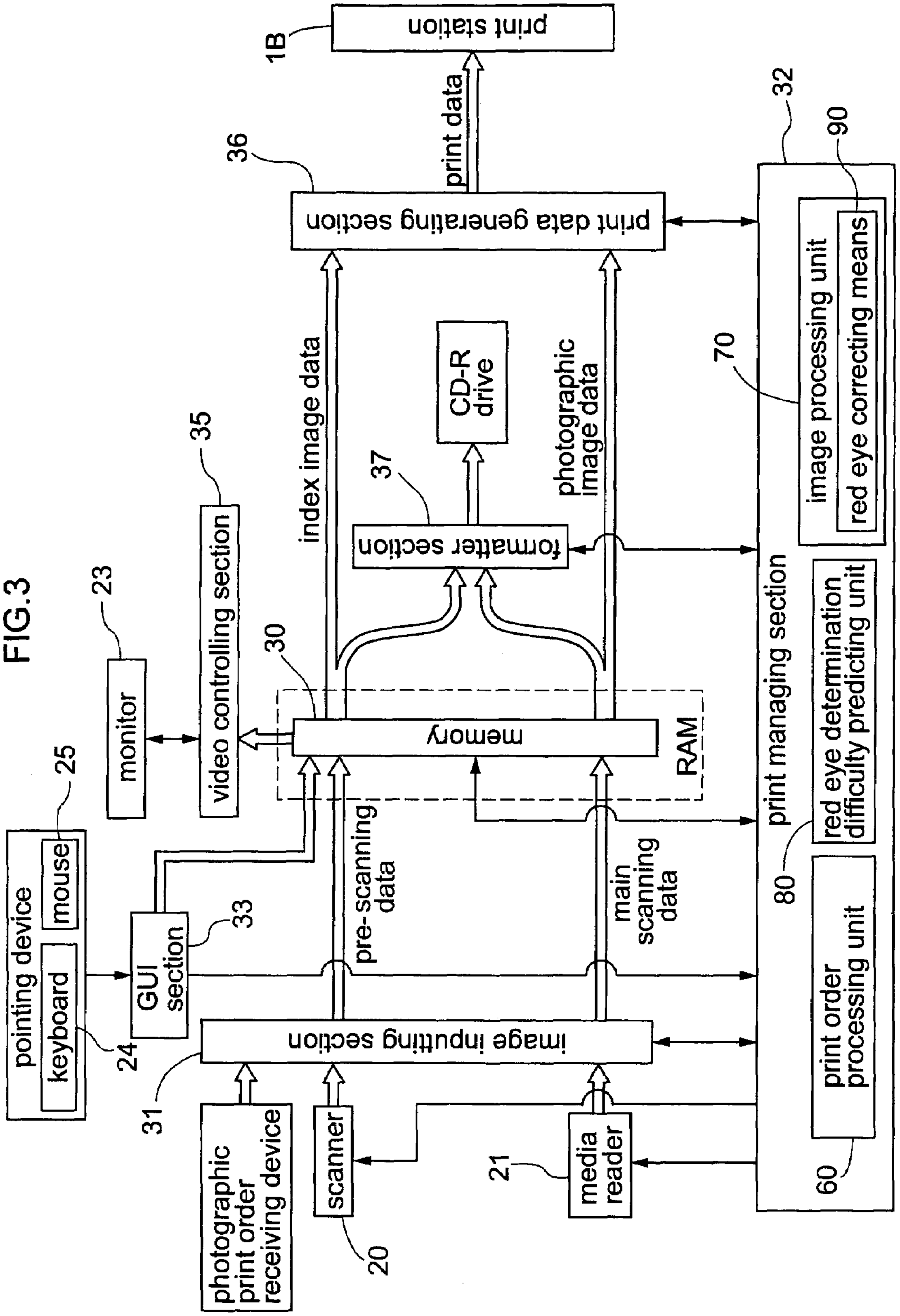
FIG. 3 is a functional block diagram for illustrating functional blocks or sections provided in a controller of the photographic printing system.

The controller 3 for the photographic printing system includes a CPU as a core component thereof and includes also various functional blocks or sections for effecting various operations of the photographic printing system realized in the form of hardware and/or software. Of these functional sections, as shown in FIG. 3, the following sections are of particular relevance to the present invention. An image inputting section 31 is provided for inputting the image data read by the scanner 20 or the media reader 21 and effecting any preparatory operation needed for a subsequence process. A GUI section 33 constitutes a graphic user interface (i.e., GUI) configured for creating a graphically assisted operation screen having various windows, various operation buttons or the like and generating control commands from user's operation inputs (via the keyboard 24, the mouse 25 or the like) effected through such graphic operation screen. A print managing section 32 effects, e.g., an image processing operation on the image data transmitted from the image inputting section 31 to a memory 30 in order to generate desired print data according to a control command sent from the GUI section 33 or an operation command directly inputted via e.g. the keyboard 24. A video controlling section 35 generates wide signals for causing the monitor 32 to display a print source image or a simulated image as an expected finished print image during a pre-judge printing operation for, e.g., color correction and to display also the graphic data sent from the GUI section 33. A print data generating section 36 generates print data suited for the print exposing unit 14 mounted in the print station 1B, based on final image data whose image processing has been completed. A formatter section 37 formats raw image data or the finally processed image data into a format writable in, e.g., a CD-R, in accordance with a customer's request.

Referring more particularly to the image inputting section 31, in case the photographic image recording media is a film 2*a,* this image inputting section 31 transmits scanned data scanned in a pre-scanning mode and a main scanning mode, separately to the memory 30, to effect a preparatory operation suited for each particular purpose. Whereas, in case the photographic image recording media is a memory card 2*b,* if the inputted image data contains thumbnail image data (low resolution data), the section 31 transmits this thumbnail data to the memory 30 separately from the main data (high resolution data) of the photographic image, so that the thumbnail data may be used for e.g. list (summary) display on the monitor 23. On the other hand, if no thumbnail data are contained therein, the image inputting section 31 creates reduced images from the main data and sent these as thumbnail data to the memory 30. Further, this image inputting section 31 is connected also to a device commonly known as photographic print order receiving device, for automatically receiving a customer's order for prints. Then, when the image inputting section 31 receives print order data relating to a print size, a number of prints to be made, etc., image attribute data relating to photographic condition and image data, the image inputting section 31 transmits the image data to the memory 30, and transmits the print order data and the image attribute data to the print managing section 32, respectively. In the case of an order for standard photos, then, this the print order data relating to e.g. a print size, the number of prints, etc. and also, if necessary, the image attribute data relating to presence/absence of flash photography, the type of camera used, etc. will be sent to the print managing section 32 in response to an operator's input operation to that effect via e.g. the keyboard 24.

The print managing section 32 includes a print order processing unit 60 for managing the print size, the number of prints, etc. and an image processing unit 70 for effecting photo retouching operations such as color correction, filtering (for color softening or sharpness adjustment) on the image data mapped in the memory 30. In the instant embodiment, the print managing section 32 further includes a red eye determination difficulty predicting unit 80 for predicting possibility of red eye phenomenon or difficulty of red eye correction, based on the inputted attribute data relating to the presence/absence of flash photography, the camera type, etc. However, the invention may be embodied without this predicting unit 80. Also, preferably, this red eye determination difficulty predicting unit 80 operates according to an algorithm configured for the prediction of the possibility of red eye phenomenon (no red eye phenomenon occurs when no flash is used) or difficulty of red eye correction (difficulty of red eye determination varies according to photographic condition), based on the inputted attribute data. In actuality, such predication can be done by the operator and the operator may then manually input his/her prediction results.

Figure 4:
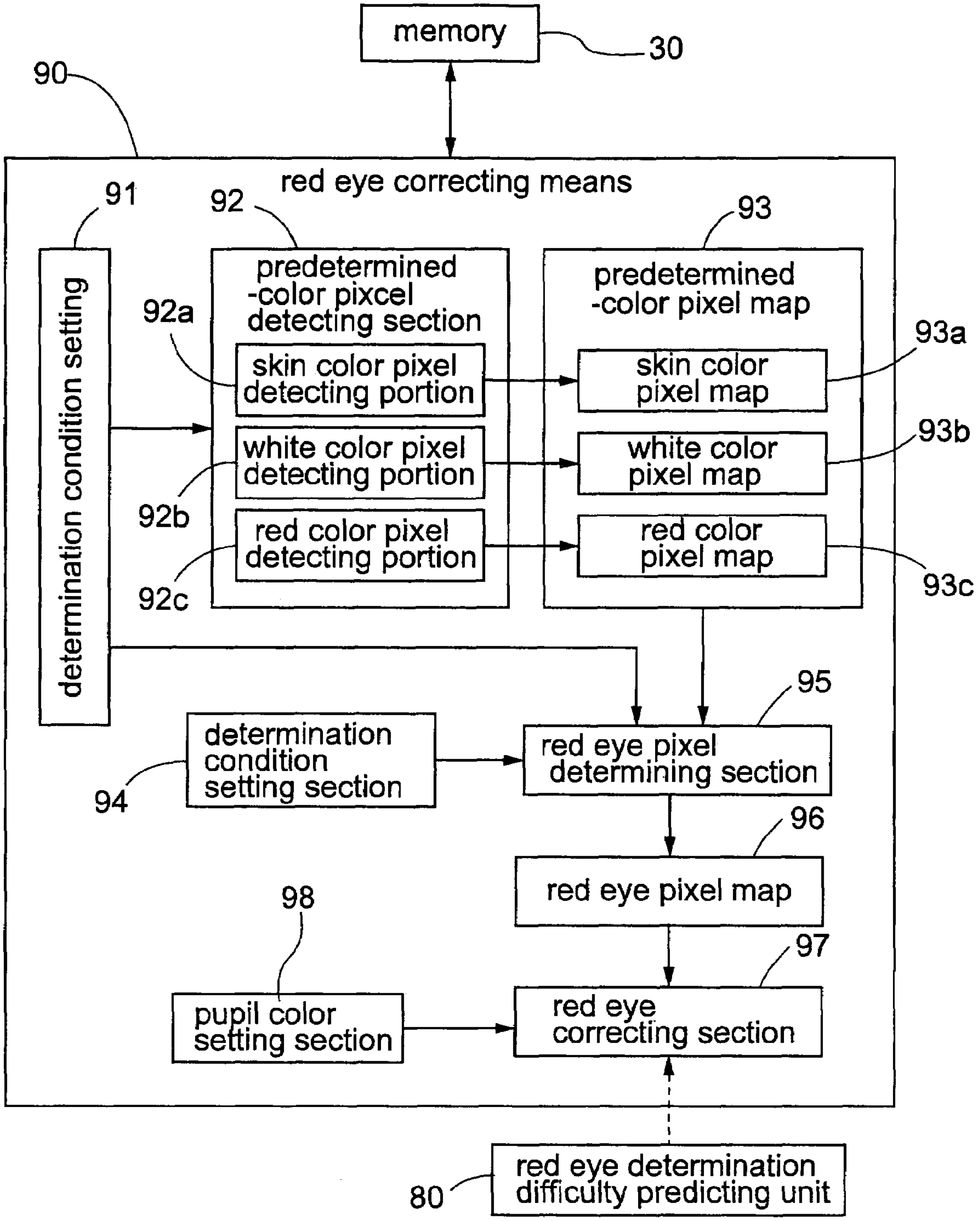
FIG. 4 is a block diagram showing functional blocks of a red eye correcting means.

The image processing unit 70 described above includes a red eye correcting means 90 implementing the technique of this invention. More particularly, as shown in FIG. 4, this red eye correcting means 90 includes a determination condition setting section 91 for setting and maintaining a skin color detection condition, a white color detection condition and a red color detection condition, a predetermined-color pixel detecting section 92 consisting of a skin color pixel detecting portion 92*a* for detecting a skin color pixel from the image data based on the skin color detection condition, a white color pixel detecting portion 92*b* for detecting a white color pixel from the image data based on the white color detection condition and a red color pixel detecting portion 92*c* for detecting a red color pixel from the image data based on the red color detection condition, a predetermined-color pixel map 93 consisting of a skin color pixel map 93*a* for storing the position of the detected skin color pixel, a white color pixel map 93*b* for storing the position of the detected white color pixel and a red color pixel map 93*c* for storing the position of the detected red color pixel, a determination condition setting section 94 for setting and maintaining a red eye determination condition for distinguishing a red eye pixel from detected red color pixel, a red eye pixel determining section 95 for setting the detected red color pixel as a red eye pixel candidate and determining the red eye pixel candidate as a red eye pixel based on the red eye determination condition, a red eye pixel map 96 for storing the position of the determined red eye pixel, and a red eye correcting section 97 for effecting the red eye correction by changing the pixel value of the red eye pixel with reference to the red eye pixel map 96.

The red eye pixel determining section 95 sets a red color pixel as a red eye pixel candidate with reference to the red color pixel map 93*c* and also determines whether this red eye pixel candidate is determined as a red eye pixel or not, by counting the numbers of the skin color pixels and the white color pixels which are present within an area around this red eye pixel candidate and then comparing these respective counts with determination values defined by the red eye determination condition.

Referring to the red eye correcting section 97 for effecting the red eye correction by changing the pixel value of the red eye pixel, to this end, this section usually effects an operation for reducing a chroma. This is because such reduction in chroma of the red eye pixel results in the red eye pixel appearing grayish, i.e. more like the real pupil color. However, in the case of a subject having a special color of pupil, such chroma reduction alone will not cause the red eye pixel to appear like the real pupil of the subject. To cope with such case, in this embodiment, there is provided a pupil color setting section 98. This allows the red eye correction to be effected also in such a manner as to cause the pixel value of a red eye pixel to approximate a pixel value corresponding to the real pupil color of the subject.

Figure 5:
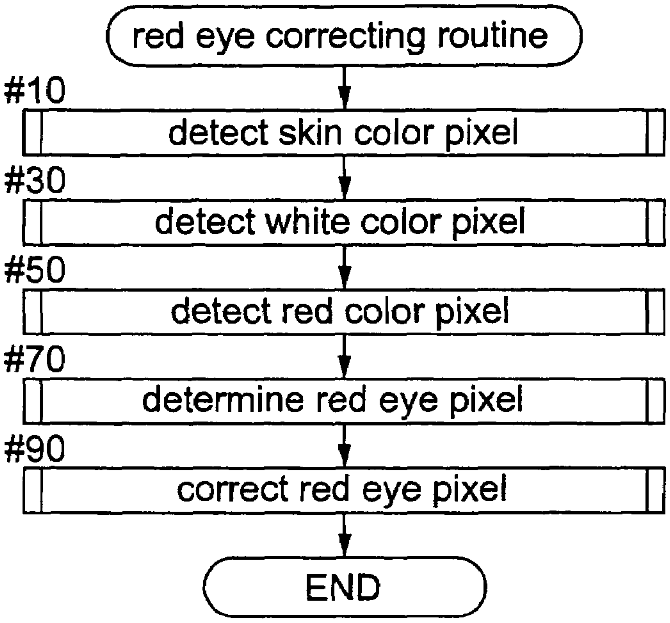
FIG. 5 is a flowchart illustrating a red eye correcting process in its entirety.

Next, the process of red eye correction by the red eye correcting means 90 having the above-described construction will be described with reference to the flowchart shown in FIG. 5 which illustrates the general flow of this operation. First, the process effects skin color pixel detection (step #10), white color pixel detection (step #30) and red color pixel detection (#50). As each detected red color pixel is set as a red eye pixel candidate, the process then checks whether this red eye pixel candidate can be determined as a red eye pixel or not, based on the distribution conditions of the skin color pixels and the white color pixels present around such each detected red color pixel. When it is found that the determination condition is met, then, this red color pixel is determined as a red eye pixel (step #70). Upon determination of the red eye pixel, the process effects the red eye correction operation on this pixel by reducing its chroma or changing its value to that corresponding to the real pupil color (step #90). In doing this, as the degree of effecting the correction, the process employs a preset value or a value determined based on predicted difficulty of red eye determination.

Figure 6:
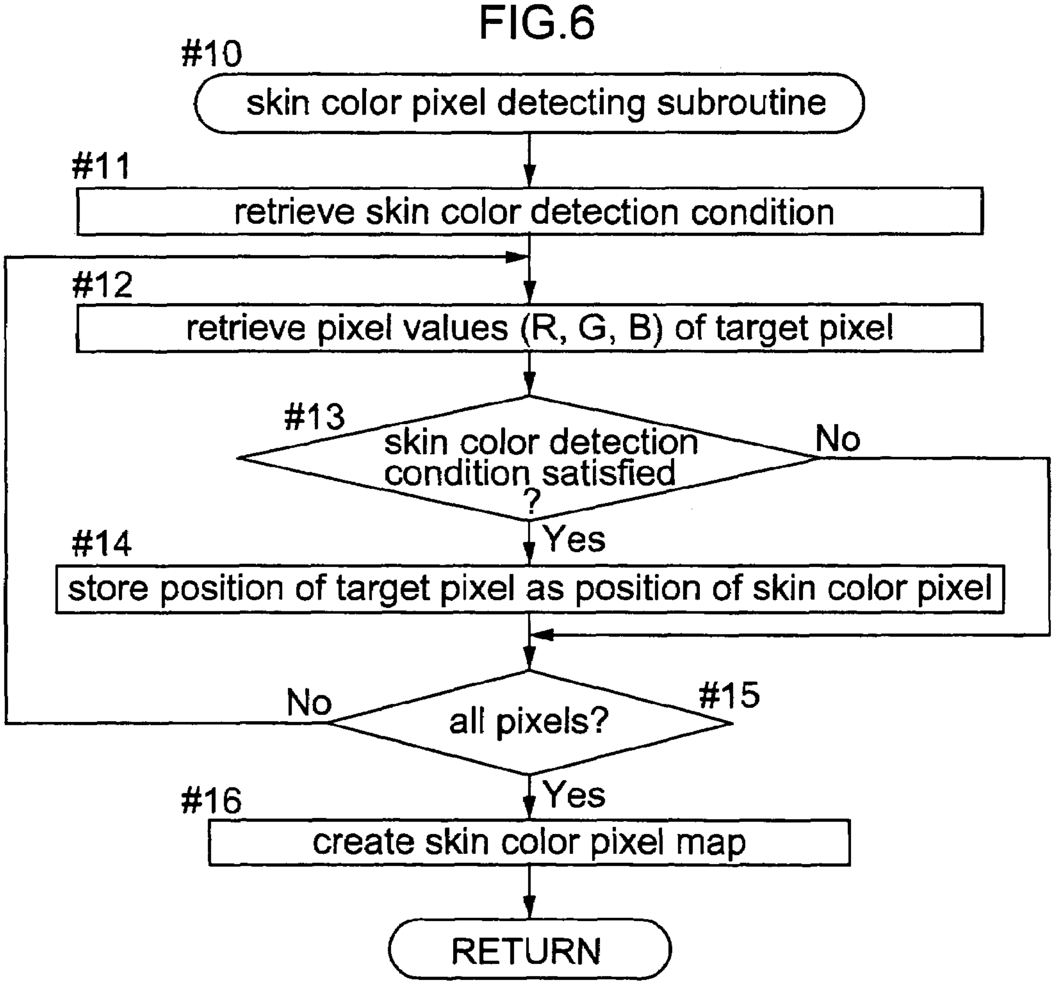
FIG. 6 shows a subroutine for skin color detection.

Next, each of the above-described steps will be described in greater details. The skin color pixel detection is executed at the skin color pixel detecting portion 92*a* according to a subroutine shown in FIG. 6. First, the process retrieves the skin color detection condition from the determination condition setting section 91 (step #11). This skin color detection condition is represented as:

$$[fs\_gb\_lo<G-B<fs\_gb\_hi], \text{ AND}$$

$$[fs\_rg\_lo<R-G<fs\_rg\_hi], \text{ AND}$$

$$[fs\_br\_lo<B-R<fs\_br\_hi], \text{ AND}$$

$$[I>fs\_I].$$

where R, G, B are R, G, B brightness values of a target pixel and $(R+G+B)/3=I$.

If the target pixel satisfies the skin color determination condition consisting of the above-described four conditions, this target pixel is determined as a skin color pixel. In this, in case the R, G, B brightness values respectively comprise 8-bit color data (0-255), the above respective coefficients can be set as follows (in the following discussion, it is assumed that R, G, B brightness values comprise 8-bit color data):

$$fs\_gb\_lo=-24;\ fs\_gb\_hi=16;\ fs\_rg\_lo=-16;\ fs\_rg\_hi=64;$$

$$fs\_br\_lo=-88;\ fs\_br\_hi=8;\ fs\_I=104.$$

The process inputs the R, G, B brightness values as the pixel values of the target pixel (step #12), checks whether the skin color determination condition is met or not (step #13), and then stores the position of the target pixel which has been found to satisfy the skin color determination condition as a position of the skin color pixel (step #14). This skin color pixel detection is effected on each and every pixel constituting the image data. When, the skin color pixel detection has been completed for all the pixels (step #15), the process creates the skin color pixel map 93*a* based on the positions of the stored skin color pixels (step #16). Incidentally, this creation of the skin color pixel map 93*a* can be effected for each detection of a skin color pixel at step #14.

Figure 7:
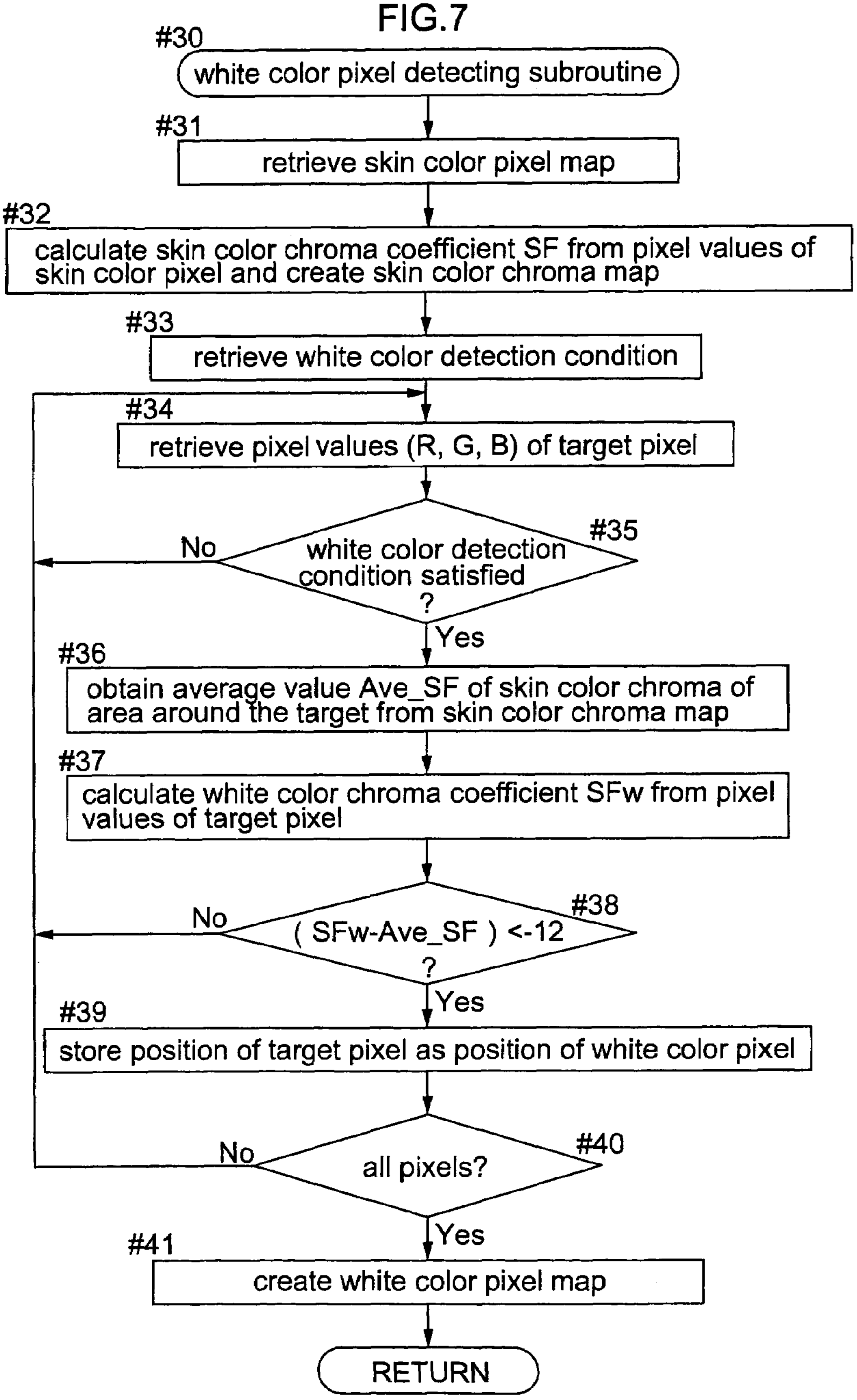
FIG. 7 shows a subroutine for white color detection.

Next, the white color pixel detection is effected at the white pixel detecting portion 92*b* according to the subroutine shown in FIG. 7. First, the process retrieves the skin color pixel map 93*a* which was created according to the skin color pixel detection subroutine (step #31). Then, the process calculates a skin color chroma coefficient SF from the R, G, B brightness values of the skin color pixel and creates a skin color chroma map (step #32). This skin color chroma coefficient SF is obtained according to the following formula:

$$SF=SF\_rg\ X\ (R-G)+SF\_br\ X\ (B-R).$$

In the above, with coefficient setting of e.g. $SF\_rg=0.7$; $SF\_br=-1.2$, the higher the chroma of the skin color pixel, the greater the value of the skin color chroma coefficient SF; and the more the chroma is shifted to the side of the complementary color of the skin color, the smaller the value of the skin color chroma coefficient SF.

Next, the process retrieves the white color detection condition from the determination condition setting section 91 (step #33) and also inputs the R, G, B brightness values of each target pixel from the image data (step #34). This white color detection condition consists of two discreet stages as follows. First, the process checks whether the first stage detection condition is met or not (step #35). This first stage detection condition is represented by:

$$[abs(G-B)<ws\_gb], \text{ AND}$$

$$[abs(R-G)<ws\_rb] \text{ AND}$$

$$[abs(B-R)<ws\_br] \text{ AND}$$

[I<ws_I].

In the above, abs( ) is a functional expression for obtaining an absolute value of a numerical value within ( ). If a target pixel satisfies this first stage detection condition consisting of the above four conditions, then, such target pixel is set as a white color pixel candidate. In the above, the respective coefficients can be set as follows:

ws_gb=ws_rg=ws_br=45; ws_I=112.

If the target pixel is set or determined as a white color pixel candidate (YES branched at step #35), this pixel (or white color pixel candidate) is subjected to a second stage detection condition. This detection condition includes, as detection elements thereof, an average chroma coefficient of the skin color pixels present around the target pixel for the white color pixel detection and the chroma coefficient of the white color pixel candidate. Therefore, first, with reference to the skin color chroma map created at step #32, the process calculates in advance an average value: Ave_SF of the chroma coefficients of the skin color pixels present within a peripheral area of 40×40 pixels around the target pixel at its center (step #36). The size of this peripheral area depends on the output gradation. In this particular case, the output gradation is set at about 400 dpi. The process also calculates in advance a chroma coefficient SFw of this target pixel (white color pixel candidate) by using the same formula as employed previously for obtaining the skin color chroma coefficient SF. Through these preparatory operations, the process checks whether the target pixel (white color pixel candidate) satisfies the second stage detection condition or not (step #38). This second stage detection condition is represented by:

$[SFw-Ave\_SF<sh\_SF]$

In the above the value of the coefficient sh_SF is set to −12. If a target pixel (white color pixel candidate) satisfies this second stage detection condition (YES branched a step #38), then, this pixel is determined as a white color pixel and the position of this target pixel is stored as a position of a white color pixel (step #39). This white color pixel detection is effected on each and every pixel constituting the image data. When the white color pixel detection has been completed for all the pixels (step #40), the process makes the white color pixel map 93*b* based on the positions of the stored white color pixels (step #41). Incidentally, this creation of the white color pixel map 93*b* can be effected for each detection of a white color pixel at step #39.

Figure 8:
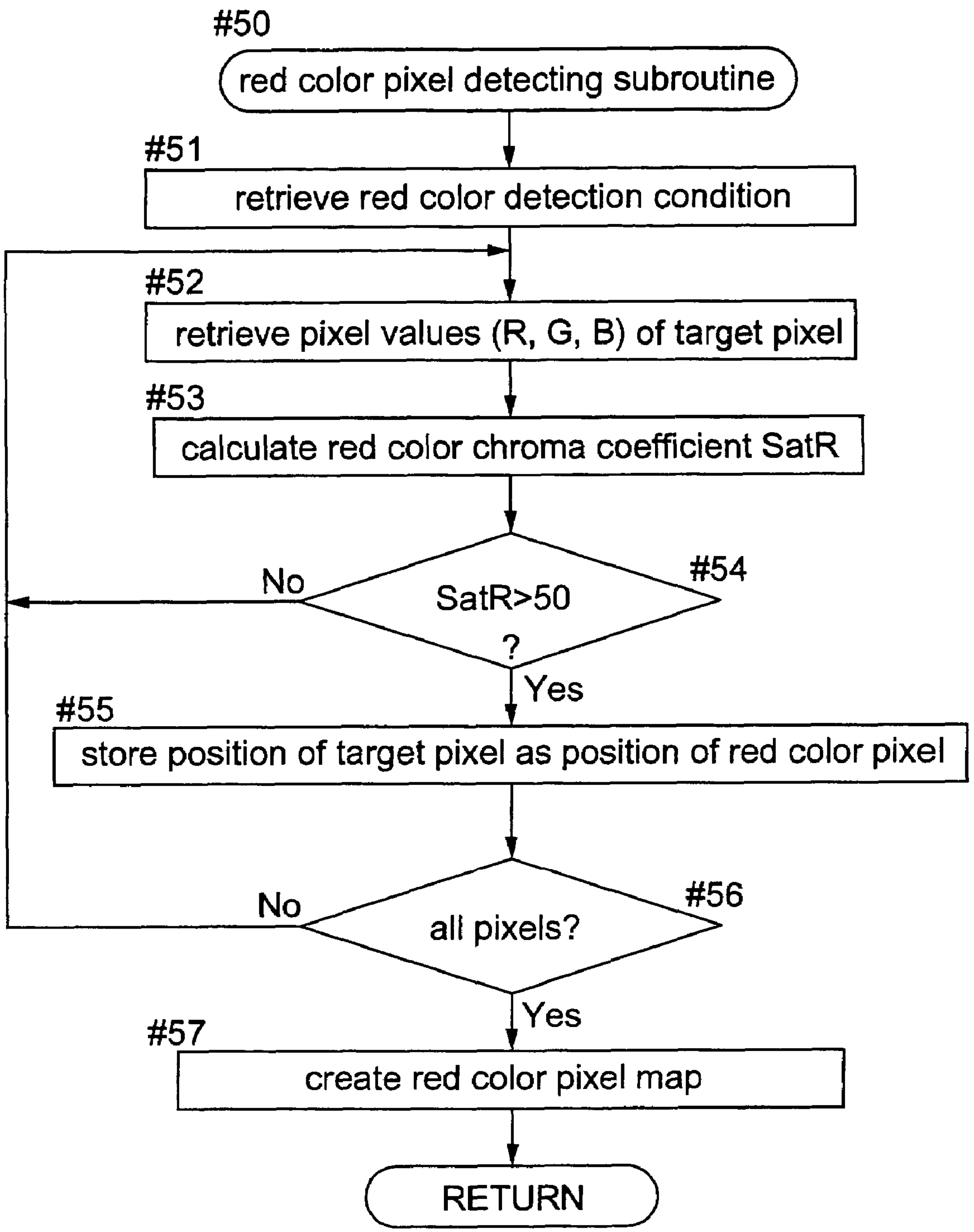
FIG. 8 shows a subroutine for red color detection.

The red color pixel detection is effected at the red pixel detecting portion 93*c* according to the subroutine shown in FIG. 8. First, the process retrieves the red color detection condition from the determination condition setting section 91 (step #51). As this red color detection condition uses a red color chroma coefficient SatR, the process first inputs the R, G, B brightness values of a target pixel (step #52) and then obtains the red color chroma coefficient SatR from these R, G, B brightness values in the manner described below (step #53).

In the following discussion, min( ) is a functional description for obtaining a minimum value of the numerical values within ( ) and max( ) is a functional description for obtaining a maximum value of the numerical values within ( ), respectively.

Hence, the process obtains in advance the coefficient: mn and the coefficient: mx as min=min (G, B) and mx=max(G, B), respectively. And, if R>mx AND R>Rsh, the process uses the formula: SatR=100×(R−mn)/(R+1); whereas, the process sets SatR=0 if R≦mx or R≦Rsh, thus obtaining a value of SatR. In this, if the R, G, B brightness values comprises 8-bit color data, the coefficient: Rsh is set preferably to about 50.

The red color detection condition is the red color chroma coefficient thus obtained being greater than the determination coefficient: Sh_SatR. In this case, as the determination coefficient is set as: Sh_SatR=50, the process checks whether the red color detection condition [SatR>50] is satisfied or not (step #54). And, the position of a target pixel satisfying this red color determination condition is stored as a position of a red color pixel (step #55). This red color pixel detection is effected on each and every pixel constituting the image data and when the red color pixel detection has been completed for all the pixels (step #56), the process creates the red color pixel map 93*c* based on the stored positions of the red color pixels (step #57). Incidentally, this creation of the red color pixel map 93*c* can be effected for each detection of a red color pixel at step #55.

Figure 9:
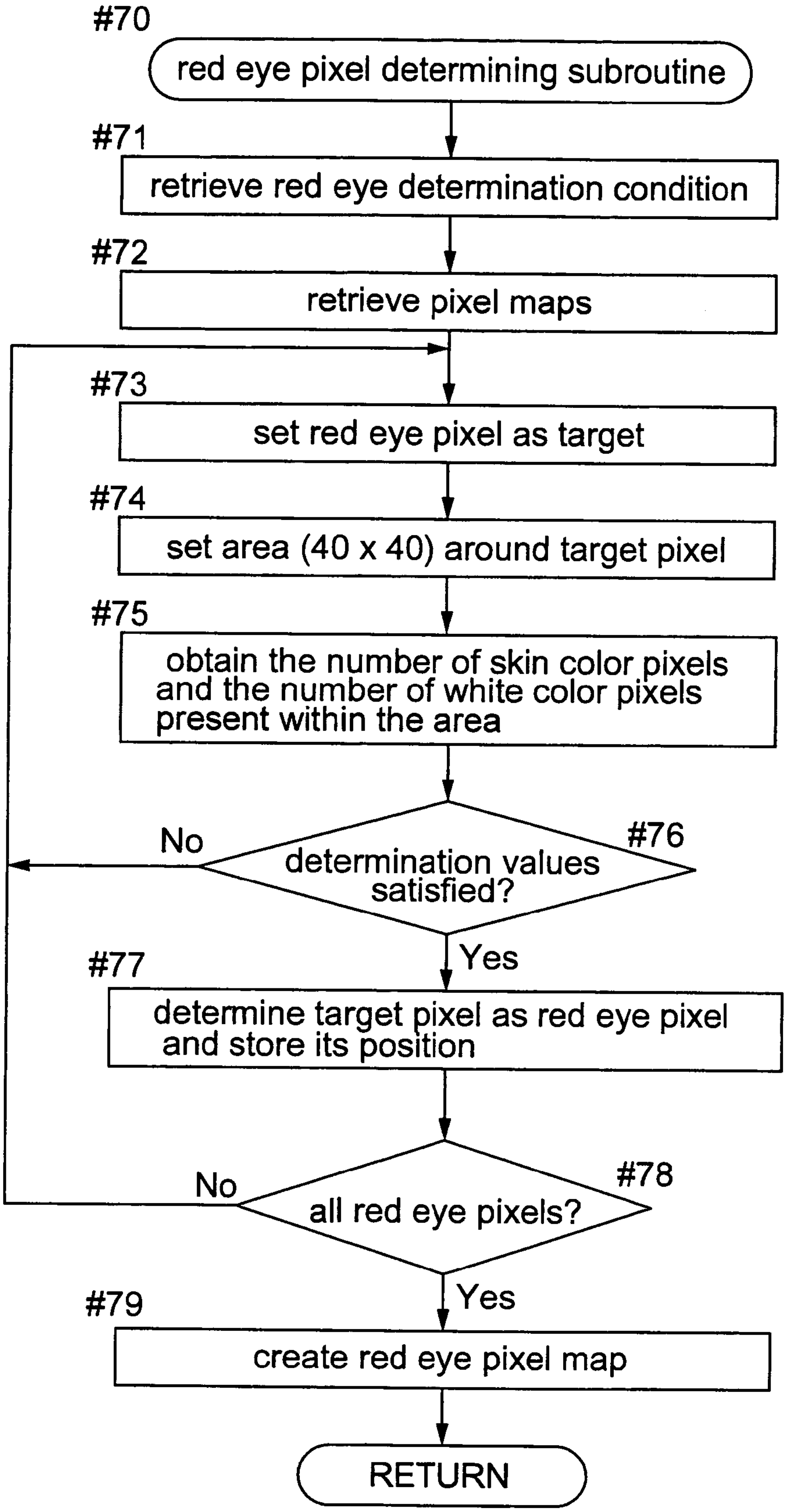
FIG. 9 shows a subroutine for red eye determination.

The determination of a red eye pixel is effected at the red color pixel detecting portion 92*c* according to the subroutine shown in FIG. 9. First, the process retrieves the red eye determination condition from the red eye determination condition setting section 94 (step #71). Further, as this red eye pixel determination uses the information relating to the skin color pixels, the white color pixels and the red color pixels, the process retrieves also the skin color pixel map 93*a*, the white color pixel map 93*b* and the red color pixel map 93*c* (step #72). Also, as the pixels which can be red eye pixel candidates are red color pixels, the red color pixels will be set one after another as a target pixel for the red eye pixel determination (step #73). Next, the process sets a process target peripheral area of about 40×40 pixels around each target pixel as its center (step #74). Upon setting of this peripheral target area, the process obtains the number of the skin color pixels and the number of the white color pixels which are present within the peripheral area, with reference to the skin color pixel map 93*a* and the white color pixel map 93*b*, respectively (step #75).

Figure 10:
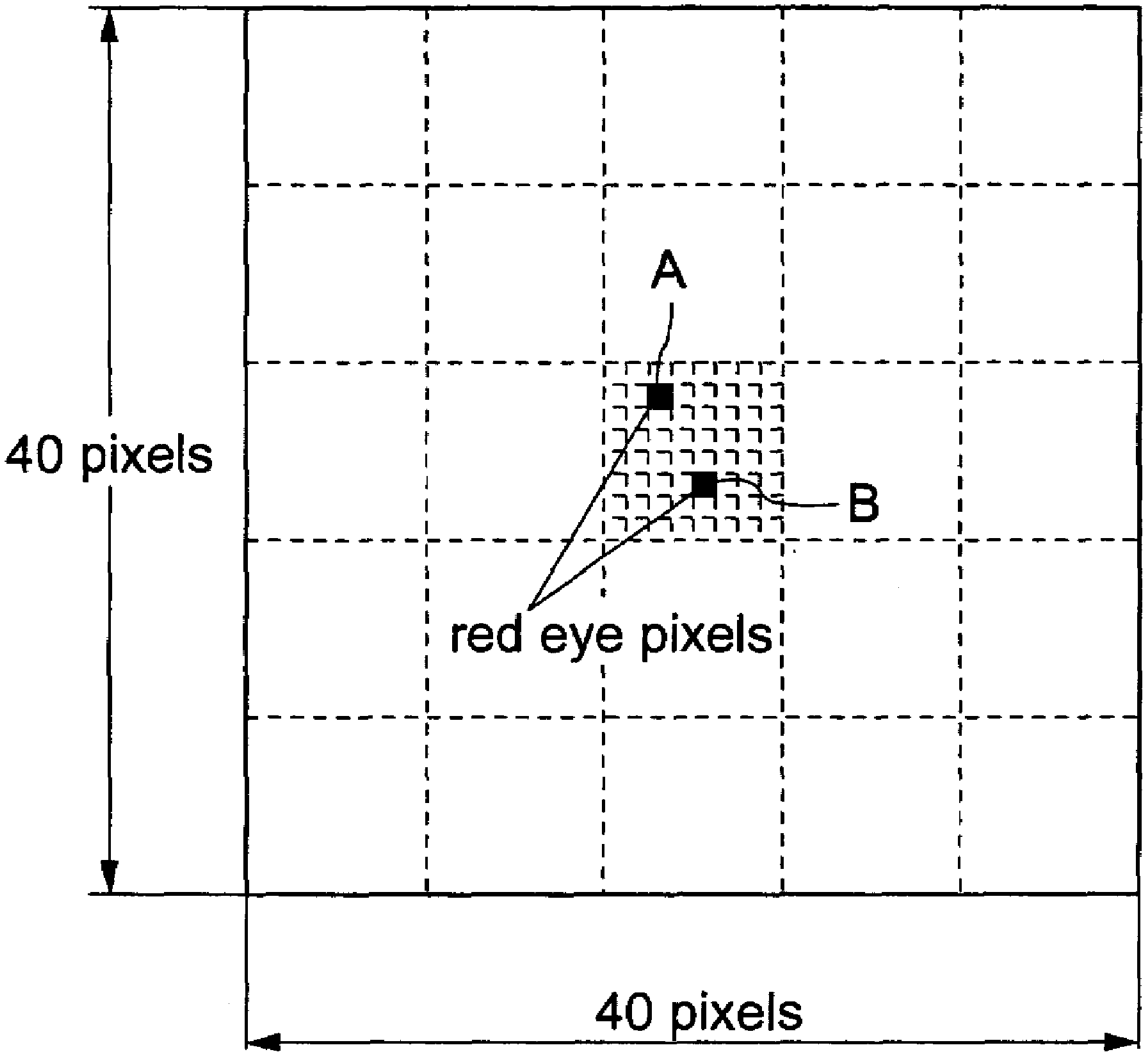
FIG. 10 is an explanatory view illustrating division of a peripheral area for use in the red eye determining process.

Preferably, for the sake of the economy of calculations, when obtaining the number of the skin color pixels and the number of the white color pixels present within the peripheral area of 40×40 pixels, as shown in the diagram of FIG. 10, the peripheral area may be divided into a plurality of blocks each including 8×8 pixels, and the number of the skin color pixels and the number of the white color pixels may be obtained for each one of the total: 5×5=25 blocks. Then, for red color pixels (shown at A and B in the figure) located within a same block, the number of the skin color pixels and the number of the white color pixels which have been obtained for one red pixel may be used also for the other red pixel. In this way, the calculation load can be reduced advantageously.

The red eye determination condition is a condition of the number of the skin color pixels and the number of the white color pixels present within the peripheral target area being greater than a respective determination value. This determination value can be obtained through experiments. Further, this determination value depends on the size of the peripheral target area described above. Hence, depending on the size of the peripheral area set at step #74, the determination values will be set automatically and appropriately. For instance, in the case of a standard human subject photography, if the peripheral area consists of 40×40 pixels, the determination value for the skin color pixels will be set as 250 to 300 pixels and the determination value for the white color pixels will be set as 15 to 30 pixels.

The process checks whether the red eye determination condition using such determination values as above is met or not (step #76), and then stores the position of the target pixel (red color pixel) which has been found to satisfy this red eye determination condition as a position of a red eye pixel (step

#77). This red eye pixel detection is effected on each and every pixel constituting the image data. When, the red eye pixel determination has been completed for all the pixels (step #78), the process creates the red eye pixel map 96 based on the stored positions of the red eye pixels (step #79). Incidentally, this creation of the red eye pixel map 96 can be effected for each detection of a red eye pixel at step #77.

After the above-described creation of the red eye pixel map 96 storing or registering the positions of the red eye pixels in the image data, the process then corrects the red eye pixels through an appropriate red eye correction technique. In this embodiment, the red eye correction is done by reducing the chroma of red eye pixel. In doing this, the chroma reduction is made according to the following formula:

$$d=(R+G+B)/3$$

$$R'=(1-t)Xd+tXR$$

$$G'=(1-t)Xd+tXG$$

$$B'=(1-t)Xd+tXB.$$

That is to say, by changing the brightness values (R, G, B) of the red eye pixel to (R', G', B') respectively, the red eye pixel can be corrected to a natural pupil color. In the above, the coefficient (t) represents the degree of red eye correction. Specifically, this value being 1 means no correction at all. This value being 0 means the maximum degree of correction, i.e. changing the color to gray completely. If needed, this correction degree (t) can be set variably in accordance with predicted difficulty of red eye correction determined by red eye determination difficulty predicting unit 80. Or, when such difficulty is not predictable, then, a preset value of 0.45 to 0.55 may be employed. With such presetting, it is possible to obtain a natural looking photographic print, through good balance between an advantage of prevention of red eye phenomenon by accurate red eye detection and disturbance in the photographic image due to erroneous detection of red eye.

The above-described technique of red eye correction relying on the reduction of chroma of a red eye pixel does not necessarily work well in case the actual color of the pupil is light blue or green. In such case, the process may employ a different red eye correction technique in which the brightness values of a red eye pixel are approximated to brightness values of a pupil which are inputted and set in advance by the optionally provided pupil color setting section 98. In doing this, the coefficient (t) can be represented as a desired position on a straight gradation line extending from the brightness value of the red eye pixel to the brightness value of the pupil color, with the coefficient (t) being 0 meaning zero correction, (t) being 1 meaning complete shift to the brightness value of the pupil color, a value therebetween being a shift to a desired gradation value somewhere therebetween.

In either case, the image data which have been subjected to an appropriate degree of red eye correction will be then subjected to a necessary image processing and transmitted to the print exposing unit 14, which then exposes a print paper P based on this print data, thereby to produce a finished print.

In the foregoing embodiment, there is employed the so-called silver salt photographic printing technique wherein the print station 1B effects exposure of the print paper P with a photographic image at the print exposing unit 14 and then develops a plurality of developing operations of this exposed print paper P. Needless to say, in this invention, the print station 1B is not limited to such type. Instead, various photographic printing systems such as an ink jet printing for forming an image by jetting ink on to a film or a paper, a heat transfer printing method using a heat-sensitive sheet, etc.

The invention claimed is:

1. A method for correcting red eye phenomenon in photographic image data, comprising the steps of:

detecting a skin color pixel in the image data based on a predetermined skin color detection condition;

detecting a white color pixel in the image data based on a predetermined white color detection condition;

detecting a red color pixel in the image data based on a predetermined red color detection condition;

dividing the image data into a plurality of blocks of a predetermined size and setting the detected red color pixel as a red eye pixel candidate and then determining the red eye pixel candidate as a red eye pixel according to a determination condition using the number of the skin color pixels and the number of the white color pixels belonging in blocks around another block in which the red eye pixel candidate belongs; and correcting the red eye phenomenon by changing a pixel value of said determined red eye pixel; and wherein said skin color detection condition is defined by using respective differences between R, G, B values of each pixel and a brightness value of this pixel; the white color detection condition is defined by using a skin color chroma value of a white color pixel candidate and an average skin color chroma value of the skin color pixels present around the white color pixel candidate; and the red color detection condition is defined by using a red color chroma value.

2. The image processing method according to claim 1, wherein the red eye correction is effected by reducing the chroma of the red eye pixel.

3. The image processing method according to claim 1, wherein the red eye correction is effected in such a manner as to approximate the pixel value of the red eye pixel 'to a value corresponding to the set pupil color.

4. The image processing method according to claim 1, wherein in changing the pixel value of the determined red eye pixel for red eye correction, the degree of the red eye correction is adjusted according to predicted difficulty in the red eye determination.

5. A computer-readable medium comprising computer-executable instructions for correcting red eye phenomenon in photographic image data, said computer-executable instructions being for:

detecting a skin color pixel in the image data based on a predetermined skin color detection condition by a skin color pixel detecting portion;

detecting a white color pixel in the image data based on a predetermined white color detection condition by a white color pixel detection portion;

detecting a red color pixel in the image data based on a predetermined red color detection condition by a red color pixel detecting portion;

dividing the image data into a plurality of blocks of a predetermined size and setting the detected red color pixel as a red eye pixel candidate and then determining the red eye pixel candidate as a red eye pixel according to a determination condition using the number of the skin color pixels and the number of the white color pixels belonging in block around another block in which the red eye pixel candidate belongs by a red eye pixel determining section; and correcting the red eye phenomenon by changing a pixel value of said determined red eye pixel by a red eye correcting section; and wherein said skin color detection condition is defined by using respective differences between R, G, B values of each pixel and a brightness value of this pixel; the white color detection condition is defined by using a skin color chroma value of a white color pixel candidate and an average skin color chroma value of the skin color pixels present around the white color pixel candidate; and the red color defection condition is defined by using a red color chroma value.

6. An image processing apparatus for correcting red eye phenomenon in photographic image data, comprising:

a skin color pixel detecting portion for detecting a skin color pixel in the image data based on a predetermined skin color detection condition;

a white color pixel detecting portion for detecting a white color pixel in the image data based on a predetermined white color detection condition;

a red color pixel detecting portion for detecting a red color pixel in the image data based on a predetermined red color detection condition;

a red eye pixel determining section for dividing the image data into a plurality of blocks of a predetermined size and setting the detected red color pixel as a red eye pixel candidate and then determining the red eye pixel candidate, as a red eye pixel according to a determination condition using the number of the skin color pixels and the number of the white color pixels belonging in blocks around another block in which the red eye pixel candidate belongs; and a red eye correcting section for correcting the red eye phenomenon by changing a pixel value of said determined red eye pixel; and wherein said skin color detection condition is defined by using respective differences between R, G, B values of each pixel and a brightness value of this pixel; the white color detection condition is defined by using a skin color chroma value of a white color pixel candidate and an average skin color chroma value of the skin color pixels present around the white color pixel candidate; and the red color detection condition is defined by using a red color chroma value.

7. The image processing apparatus according to claim 6, further comprising a red eye determination difficulty predicting unit for predicting difficulty of the red eye correction, such that the red eye correcting section adjusts the degree of the red eye correction according to predicted difficulty in the red eye determination.

8. A method for correcting red eye phenomenon in photographic image data, comprising the steps of:

detecting a skin color pixel in the image data based on a predetermined skin color detection condition;

detecting a white color pixel in the image data based on a predetermined white color detection condition;

detecting a red color pixel in the image data based on a predetermined red color detection condition;

setting the detected red color pixel as a red eye pixel candidate and then determining the red eye pixel candidate as a red eye pixel according to a determination condition using the number of the skin color pixels and the number of the white color pixels detected respectively within an area around the red eye pixel candidate; and correcting the red eye phenomenon by changing a pixel value of said determined red eye pixel; and wherein said skin color detection condition is defined by using respective differences between R, G, B values of each pixel and a brightness value of this pixel; the white color detection condition is defined by using a skin color chroma value of a white color pixel candidate and an average skin color chroma value of the skin color pixels present around the white color pixel candidate; and the red color defection condition is defined by using a red color chroma value.

9. An image processing apparatus for correcting red eye phenomenon in photographic image data, comprising:

a skin color pixel detecting portion for detecting a skin color pixel in the image data based on a predetermined skin color detection condition;

a white color pixel detecting portion for detecting a white color pixel in the image data based on a predetermined white color detection condition;

a red color pixel detecting portion for detecting a red color pixel in the image data based on a predetermined red color detection condition;

a red eye pixel determining section for setting the detected red color pixel as a red eye pixel candidate and then determining the red eye pixel candidate as a red eye pixel according to a determination condition using the number of the skin color pixels and the number of the white color pixels detected respectively within an area around the red eye pixel candidate; and a red eye correcting section for correcting the red eye phenomenon by changing a pixel value of said determined red eye pixel; and wherein said skin color detection condition is defined by using respective differences between R, G, B values of each pixel, and a brightness value of this pixel; the white color detection condition is defined by using a skin color chroma value of a white color pixel candidate and an average skin color chroma value of the skin color pixels present around the white color pixel candidate; and the red color detection condition is defined by using a red color chroma value.

* * * * *